US012169328B2

(12) United States Patent
Ameurlain et al.

(10) Patent No.: US 12,169,328 B2
(45) Date of Patent: Dec. 17, 2024

(54) METHOD FOR OBTAINING DATA REPRESENTATIVE OF THE OUTLINE OF A SHOULDER DELIMITING A STEP-BACK PORTION IN AN EYEGLASS

(71) Applicant: ESSILOR INTERNATIONAL, Charenton-le-Pont (FR)

(72) Inventors: Hugues Ameurlain, Charenton-le-Pont (FR); Nicolas Jamet, Charenton-le-Pont (FR); Laurent Roussel, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 797 days.

(21) Appl. No.: 17/417,285

(22) PCT Filed: Dec. 23, 2019

(86) PCT No.: PCT/EP2019/086943
§ 371 (c)(1),
(2) Date: Jun. 22, 2021

(87) PCT Pub. No.: WO2020/136175
PCT Pub. Date: Jul. 2, 2020

(65) Prior Publication Data
US 2022/0091438 A1 Mar. 24, 2022

(30) Foreign Application Priority Data

Dec. 24, 2018 (EP) .................................... 18306841

(51) Int. Cl.
*B24B 9/14* (2006.01)
*G02C 7/02* (2006.01)
*G02C 13/00* (2006.01)

(52) U.S. Cl.
CPC .............. *G02C 7/028* (2013.01); *B24B 9/144* (2013.01); *G02C 13/005* (2013.01)

(58) Field of Classification Search
CPC ...... G02C 13/003; G02C 13/005; B24B 9/144
(Continued)

(56) References Cited

U.S. PATENT DOCUMENTS 6,263,583 B1 * 7/2001 Mizuno .................. B24B 49/00
33/28
6,473,977 B1 * 11/2002 Kujawa ................ G02C 13/003
33/28
(Continued)

FOREIGN PATENT DOCUMENTS

| EP | 2 489 466 | 8/2012 | |
| EP | 3546121 A1 * | 10/2019 | ............. B24B 49/02 |
| FR | 3 024 246 A1 | 1/2016 | |

OTHER PUBLICATIONS

International Search Report for PCT/EP2019/086943, mailed Mar. 23, 2020, 4 pages.
(Continued)

*Primary Examiner* — Zachary W Wilkes
(74) *Attorney, Agent, or Firm* — NIXON & VANDERHYE

(57) ABSTRACT

The method includes the steps of: providing spectacles including a template eyeglass having a mounting portion inserted in a groove of an arc and being to be replaced by a prescription eyeglass having a step-back portion with the same conformation as the mounting portion; providing a set of visible marks on the template eyeglass independently of the arc; having an outline editor providing a visualization of the template eyeglass provided with the visible marks; determining through observation of the spectacles the location—with respect to the visible marks—of points of the arc from which the template eyeglass projects; entering on the
(Continued)

provided visualization the so determined locations of the points of the arc; and outputting from the editor the data representative of an edited outline based on the point locations so entered on the provided visualization, whereby the edited outline is the outline of the shoulder.

20 Claims, 9 Drawing Sheets

(58) Field of Classification Search
USPC .......................................... 351/159.74–159.77
See application file for complete search history.

(56) References Cited

U.S. PATENT DOCUMENTS

| | | | |
|---|---|---|---|
| 6,510,362 B1* | 1/2003 | Guillermin | B24B 9/144 |
| | | | 451/5 |
| 8,827,450 B2* | 9/2014 | Tanaka | B24B 49/02 |
| | | | 351/159.75 |
| 9,664,924 B2* | 5/2017 | Baudart | B24B 13/0055 |
| 2009/0201463 A1 | 8/2009 | Carlson | |
| 2012/0206693 A1* | 8/2012 | Tanaka | B24B 9/14 |
| | | | 351/178 |
| 2015/0138501 A1* | 5/2015 | Baudart | G02C 7/027 |
| | | | 351/159.75 |
| 2017/0208229 A1 | 7/2017 | Anatole et al. | |

OTHER PUBLICATIONS

Written Opinion of the ISA for PCT/EP2019/086943, mailed Mar. 23, 2020, 6 pages

* cited by examiner

METHOD FOR OBTAINING DATA REPRESENTATIVE OF THE OUTLINE OF A SHOULDER DELIMITING A STEP-BACK PORTION IN AN EYEGLASS

This application is the U.S. national phase of International Application No. PCT/EP2019/086943 filed 23 Dec. 2019, which designated the U.S. and claims priority to EP patent application Ser. No. 18/306,841.0 filed 24 Dec. 2018, the entire contents of each of which are hereby incorporated by reference.

FIELD OF THE INVENTION

The invention relates to machining eyeglasses for enabling their mounting in spectacles frame.

BACKGROUND ART

It is known that further to edging an eyeglass according to the outline defined by the spectacles frame, it is further needed for certain spectacles frames to machine in the eyeglass a step-back portion having a constant thickness corresponding to the width of a groove of the spectacles frame so that the step-back portion can be inserted into the groove.

For machining such step-back portion, methods are already known for obtaining data representative of the outline of a shoulder delimiting the step-back portion to be machined in a pre-wearer-selected-eyeglass for becoming a wearer-selected-eyeglass comprising said shoulder between said step-back portion and an operational portion.

European patent application EP 2 489 466 discloses such a method in which a mark is attached along the inner boundary of the rim in a state where the original lens is attached to the rim; the original lens attached with the mark is detached from the rim; a lens image is obtained by photographing the detached original lens, wherein an outer outline of the mark attached to the lens surface is obtained by performing the image processing of the lens image, and the inner boundary of the rim is obtained based on the obtained outer outline of the mark.

French patent application 3 024 246 discloses also such a method in which a reference optical lens is removed from a spectacles frame; the removed reference optical lens is fixed on a support of a machine for acquiring images; at least one first image of the removed reference optical lens is acquired with an image sensor; each acquired first image is processed in order to deduce therefrom trimming parameters for the optical lens to be trimmed; and the trimming outline is defined as a function of the trimming parameters. Before or after the first acquiring step, there is a second step of acquiring a second image of the reference optical lens mounted in the spectacles frame, and in the processing step, the trimming parameters are defined as a function also of the second image.

The invention is directed to a method for obtaining data representative of the outline of a shoulder delimiting a step-back portion to be machined in a pre-wearer-selected-eyeglass, which is convenient, simple, economic and easy to carry out.

SUMMARY OF THE INVENTION

The invention accordingly provides a method for obtaining data representative of the outline of a shoulder delimiting a step-back portion to be machined in a pre-wearer-selected-eyeglass for becoming a wearer-selected-eyeglass comprising said shoulder between said step-back portion and an operational portion, including:

a) the step of providing spectacles including: an eyeglass frame having a first arc, a second arc and a bridge connecting said first arc and said second arc; a first template eyeglass having a mounting portion inserted in a groove of said first arc and an operational portion projecting from the first arc; and a second template eyeglass having a mounting portion inserted in a groove of said second arc and an operational portion projecting from the second arc;

b) the step of selecting the first template eyeglass as to be replaced by said wearer-selected-eyeglass and the step of selecting accordingly said pre-wearer-selected-eyeglass so that it can be machined for said wearer-selected eyeglass to have said step-back portion with the same conformation as the mounting portion of the first template eyeglass;

wherein said method further includes:

c) the step of providing an eyeglass outline editor including a user interface for providing an eyeglass visualization and for entering point locations on said eyeglass visualization, said editor being configured for outputting data representative of an edited outline on the basis of the point locations entered on said eyeglass visualization;

d) the step of providing a set of visible marks on said first template eyeglass independently of the first arc, said visible marks being distributed along at least one direction;

e) the step of obtaining image data of said first template eyeglass provided with said visible marks and the step of having said outline editor providing on the basis of said image data a visualization of said first template eyeglass provided with said visible marks;

f) the step of determining through observation of said spectacles the location—with respect to the visible marks—of points of the first arc from which the template eyeglass projects;

g) the step of using said interface of said eyeglass outline editor for entering on said provided visualization the so determined locations—with respect to the visible marks—of said points of the first arc; and h) the step of outputting from said editor said data representative of said edited outline on the basis of the point locations so entered on said provided visualization, whereby said edited outline is said outline of said shoulder.

The method according to the invention offers the advantage of being able to be carried out only with a conventional machine for obtaining image data of a spectacle eyeglass and a conventional eyeglass outline editor and is thus convenient, simple, economic and easy to carry out.

It should be noted that in contrast: the method disclosed by European patent application EP 2 489 466 involves a specific eyeglass outline editor able to obtain the outer outline of the mark attached to the lens surface by performing image processing of the lens image; and that the method disclosed by French patent application 3 024 246 involves a specific machine for acquiring images of a lens which is large enough for acquiring images of spectacles.

According to advantageous features as being very simple, convenient and economical for carrying out the method according to the invention:

said step of obtaining said image data of said first template eyeglass provided with said visible marks includes the step of taking a photography of said first template eyeglass;

said visible marks comprise randomly shaped and distributed markings and step f) includes identifying the portions of said markings covered or partially covered by said groove of said first arc;

said visible marks comprise dots and step f) includes distance measuring steps;

said visible marks comprise crosses and step f) includes distance measuring steps;

said visible marks are distributed according to a grid pattern, said visible marks being distributed according to a first predetermined pitch along a first predetermined direction and according to a second predetermined pitch along a second predetermined direction transverse to said first predetermined direction;

said first predetermined direction is a temporal-nasal direction and said second predetermined direction is forehead-chin direction;

said visible marks comprise a graduated line or a graduated grid and step f) includes distance measuring steps;

said visible marks comprise respective lines each extending transversely to and from the edge of said mounting portion both on the mounting portion and on the operational portion of said first template eyeglass, said method further comprising the step of providing said first arc with a landmark at the location of each said respective lines, and said step f) includes the step of measuring the depth of said groove of said first arc at each said landmark;

said visible marks are provided by ink marking said first template eyeglass;

said visible marks are provided by engraving notches and/or partial drillings into said first template eyeglass;

said set of visible marks is a landmark shoulder away from said first arc, said first template eyeglass being machined for having a landmark step-back portion delimited by said landmark shoulder;

said landmark shoulder has an uneven profile; and/or said visualization of said first template eyeglass provided with said visible marks is obtained by providing said editor with data for edging the first template eyeglass and for machining the landmark step-back portion of said first template eyeglass.

The invention further provides a method for manufacturing a wearer-selected-eyeglass from a pre-wearer-selected-eyeglass, said wearer-selected-eyeglass comprising a shoulder between a step-back portion and an operational portion, including:

the step of providing a grinding machine configured for receiving data representative of the outline of said shoulder and for grinding said step-back portion in said pre-wearer-selected-eyeglass, whereby said shoulder delimits said step-back portion;

the step of obtaining said data representative of the outline of said shoulder by implementing the method for obtaining such data described above;

the step of providing said grinding machine with said data representative of said outline of said shoulder and with said pre-wearer-selected-eyeglass; and the step of grinding said step-back portion in said pre-wearer-selected-eyeglass, whereby said pre-wearer-selected-eyeglass becomes said wearer-selected-eyeglass.

BRIEF DESCRIPTION OF THE DRAWINGS

The description of the invention now continues with a detailed description of advantageous embodiments given hereinafter by way of non-limiting example and with reference to the appended drawings. In these drawings.

DETAILED DESCRIPTION OF EXAMPLE EMBODIMENTS

Figure 1:
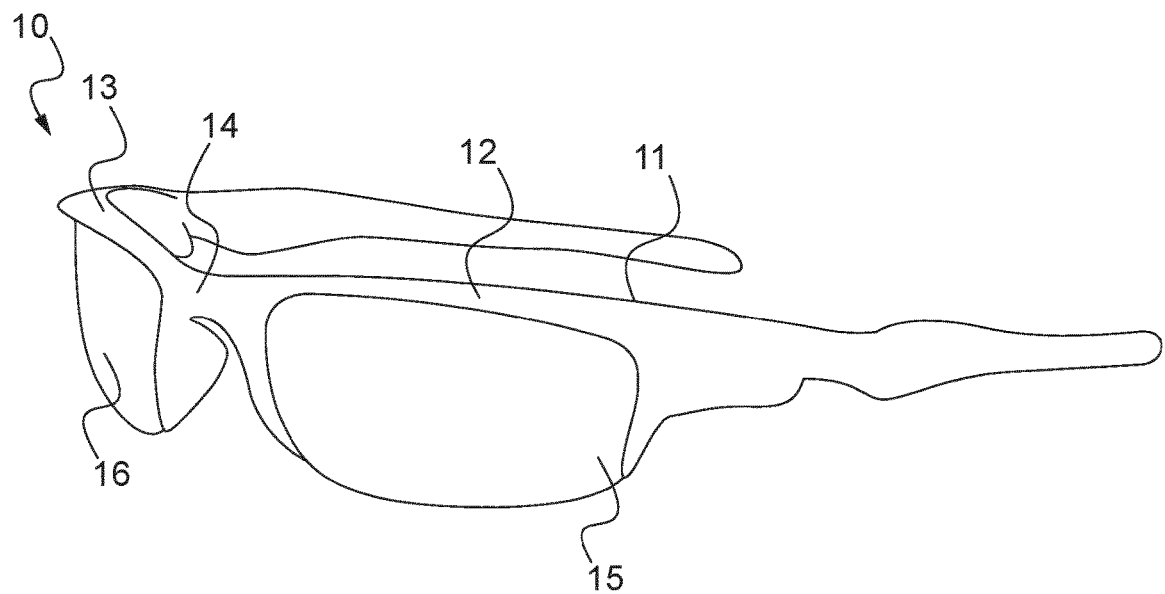
FIG. 1 is a schematic perspective view of spectacles including an eyeglass frame and two template eyeglasses each mounted in a respective arc of the eyeglass frame.

FIG. 1 shows spectacles 10 including an eyeglass frame 11 having a first arc 12, a second arc 13 and a bridge 14 connecting the first arc 12 and the second arc 13.

The spectacles 10 further includes a first template eyeglass 15 mounted in the first arc 12 and a second template eyeglass 16 mounted in the second arc 13.

In the following, the right and left sides are defined with respect to a wearer of the spectacles 10.

The arc 12 and the template eyeglass 15 are on the left side while the arc 13 and the eyeglass 16 are on the right side of the spectacles 10.

Figure 2:
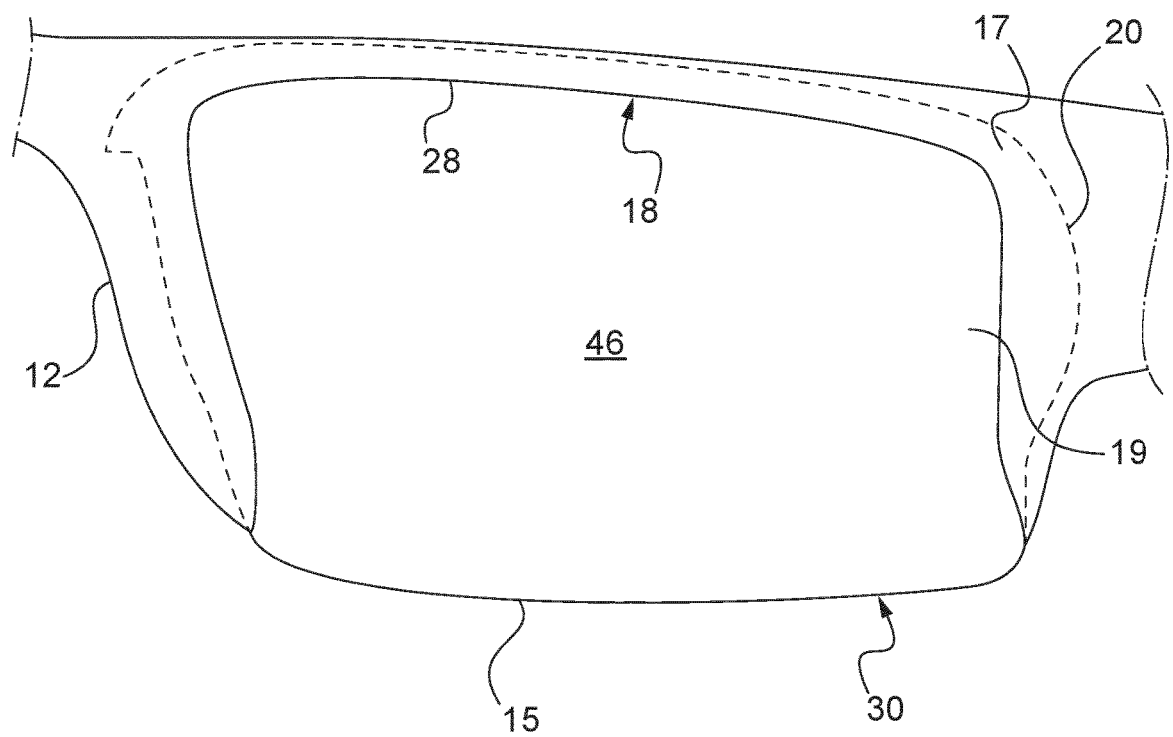
FIG. 2 is a partial view of the spectacles of FIG. 1 showing the left (with respect to a wearer of the spectacles) arc of the frame and the template eyeglass mounted therein, the outline of the portion of the eyeglass received in the arc being shown by a dotted line.

FIG. 2 shows the portion of the spectacles 10 formed by the first arc 12 and the template eyeglass 15.

Since the spectacles 10 are symmetrical, the description of the first arc 12 and the first template eyeglass 15 that follows applies mutatis mutandis to the second arc 13 and the second template eyeglass 16.

The arc 12 has an inner edge 28 defining an internal space in which is received the template eyeglass 15.

The arc 12 further has a groove 18 opening through the inner edge 28.

The template eyeglass 15 has a front face 46, a back face (not visible) and a peripheral edge 30 extending from the front face 46 to the back face and defining an outline 20.

The template eyeglass 15 has a mounting portion 17 inserted in the groove 18 of the arc 12 and an operational portion 19 projecting from the arc 12.

The operational portion 19 is the portion of the eyeglass 15 through which a wearer of the spectacles 10 can see, since it is not obstructed by the arc 12.

The mounting portion 17 is a peripheral portion of the template eyeglass 15 that partially surrounds the operational portion 19, here on its left side (temporal side), right side (nasal side) and upper side (forehead side), the lower side (chin side) of the operational portion 19 being free.

As shown on FIG. 2, the mounting portion 17 is delimited externally by the peripheral edge 30 (having the outline 20) of the template eyeglass 15 and internally by an imaginary boundary line along the inner edge 28 of the arc 12.

The portion of the peripheral edge 30 delimiting the mounting portion 17 is drawn in dotted line on FIG. 2.

The shape of the mounting portion 17 fits to the shape of the groove 18 so that the eyeglass 15 is fixedly secured to the arc 12.

In particular, all along the groove 18, the thickness of the mounting portion 17 corresponds locally to the width of the groove 18.

In addition, here, all along the groove, the width of the mounting portion 17 (the distance between the inner edge 28 of the arc 12 and the peripheral edge 30 of the template eyeglass 15 measured along a radial direction with respect to the template eyeglass 15) corresponds locally to the depth of the groove 18.

Here, the thickness of the template eyeglass 15 is uniform (and is therefore the same in the mounting portion 17 and in the operational portion 19).

The spectacles 10 are a model to be selected by a user and are for example displayed on a rack (not illustrated) in an optical store.

If the user needs a particular visual correction, the first and second template eyeglasses 15 and 16 will have to be replaced by prescription-eyeglasses, the prescription being established with respect to the user needs. The prescription-eyeglasses are therefore wearer-selected-eyeglasses.

The prescription-eyeglasses are obtained from pre-prescription-eyeglasses, the latter therefore being pre-wearer-selected-eyeglasses.

Such pre-prescription-eyeglasses have the same outline 20 as the template eyeglasses 15 and 16 but, since they are configured to exhibit a correction power, most of the time are thicker than the width of the groove 18 and therefore cannot be directly inserted therein for being mounted into the frame 11.

A peripheral portion of these pre-prescription-eyeglasses therefore has to be previously thinned by machining for becoming a mounting portion that can be inserted into the groove 18.

Figure 3:
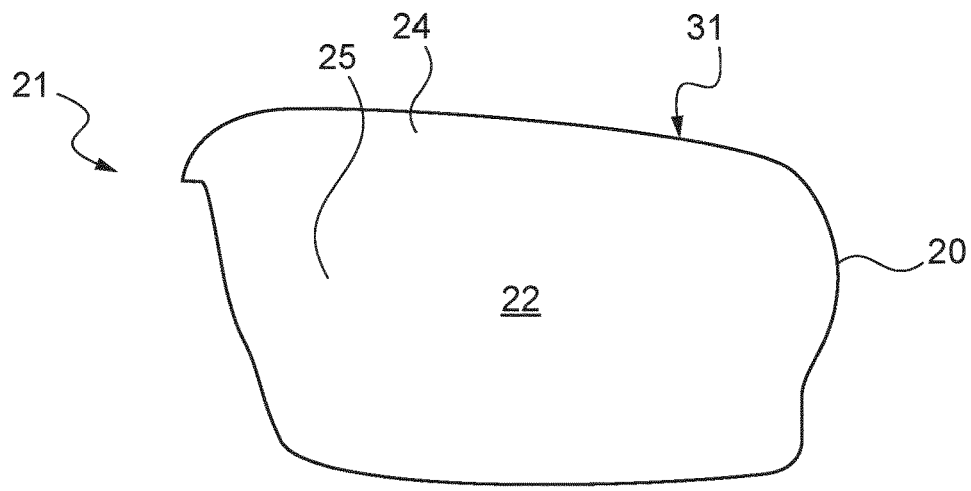
FIGS. 3 and 4 show the front face and the back face respectively of a prescription eyeglass configured to be mounted in the left arc of the frame of FIG. 1 instead of the left template eyeglass.
Figure 4:
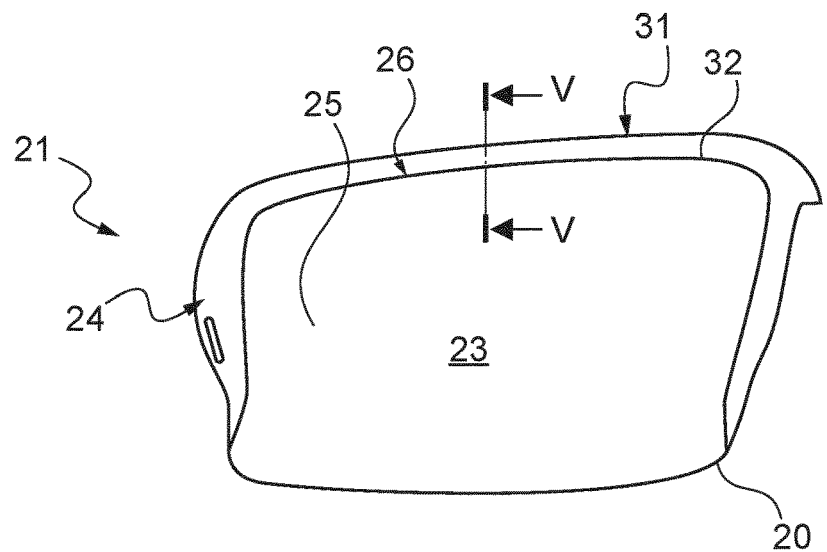
Figure 5:
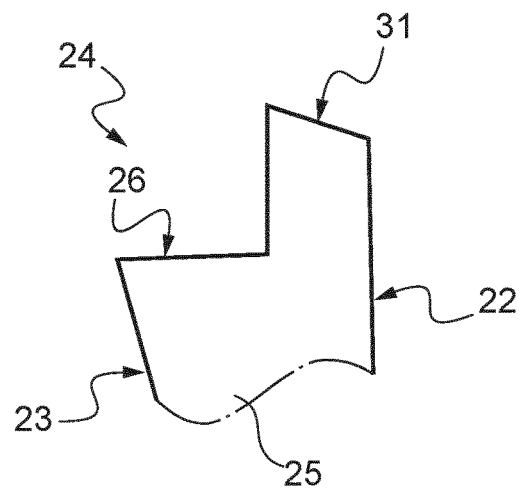
FIG. 5 is a partial sectional view identified by V-V on FIG. 4.

FIGS. 3 to 5 show a prescription-eyeglass 21 provided with such a mounting portion 24 and thus suitable for being mounted into the arc 12 of the frame 11 (instead of the template eyeglass 15).

The prescription-eyeglass 21 has a front face 22 (FIG. 3), a back face 23 (FIG. 4) and a peripheral edge 31 extending from the front face 22 to the back face 23. When the eyeglass 21 is mounted in spectacles, the front face 22 is remote from the eye of the wearer of the spectacles, while the back face 23 is opposite the eye of the wearer.

The peripheral edge 31 of the prescription-eyeglass 21 defines an outline that is identical to the outline 20 of the template eyeglass 15.

In the prescription-eyeglass 21 the mounting portion 24 is formed by a step-back portion. Further to the step-back portion 24 the prescription-eyeglass 21 has an operational portion 25.

The thickness of the step-back portion 24 is smaller than the thickness of the operational portion 25, the eyeglass 21 having a shoulder 26 between the step-back portion 24 and the operational portion 25.

The shoulder 26 has an outline 32.

The step-back portion 24 is thus a peripheral portion of the prescription-eyeglass 21 delimited externally by the peripheral edge 31 (having the outline 20) of the prescription-eyeglass 21 and internally by the shoulder 26 (having the outline 32).

The conformation of the step-back portion 24 is the same as the conformation of the mounting portion 17 of the template eyeglass 15 and the prescription-eyeglass 21 can thus be mounted into the arc 12 of the frame 11, instead of the template eyeglass 15, by inserting its step-back portion 24 into the groove 18.

Therefore, when the prescription-eyeglass 21 is mounted in the arc 12, the shape of the step-back portion 24 fits to the shape of the groove 18 so that the prescription-eyeglass 21 is fixedly secured to the arc 12.

In particular, all along the groove 18, the thickness of the step-back portion 24 corresponds locally to the width of the groove 18.

In addition, here, all along the groove 18, the width of the step-back portion 24 (the distance between the shoulder 26 and the peripheral edge 31 of the prescription-eyeglass 21) corresponds locally to the depth of the groove 18.

When the prescription-eyeglass 21 is mounted in the spectacles 10, the step-back portion 24 is received in the groove 18 with the inner edge 28 of the arc 12 that is along the shoulder 26, and with the operational portion 25 projecting from the arc 12.

It is to be noted here that the outline 32 of the shoulder 26 replicates the outline of the inner edge 28.

As mentioned above, the prescription-eyeglass 21 is obtained from a pre-prescription-eyeglass (not illustrated) having the same outline 20 as the template eyeglasses 15 but having an excessive thickness for being directly inserted into the groove 18.

The pre-prescription-eyeglass itself may have been obtained from an initially generally circular finished lens or a semi-finished lens (not illustrated) that has been surfaced to exhibit the correction power according to the prescription, and later covered by any necessary added values and such lens has been trimmed for having an outline corresponding to the outline 20.

For manufacturing the prescription-eyeglass 21 from the pre-prescription-eyeglass, a peripheral portion of the pre-prescription-eyeglass needs to be machined to have the conformation of the step-back portion 24 (which it is recalled here have the same conformation as the mounting portion 17 of the first template eyeglass 15).

Accordingly, the pre-prescription-eyeglass is selected so that it can be machined for the prescription-eyeglass to have the step-back portion 24 with the same conformation as the mounting portion 17 of the first template eyeglass 15.

In other words, the step-back portion 24 is to be machined in the pre-prescription-eyeglass for becoming the prescription-eyeglass 21 comprising the shoulder 26 between the step-back portion 24 and the operational portion 25.

In practice, the thickness of the peripheral portion has to be reduced to the width of the groove 18, or slightly thinner, and such that, when the step-back portion 24 is in the groove 18, the shoulder 26 delimiting the step-back portion 24 is along the inner edge 28 of the arc 12 and replicates its shape.

To obtain the prescription-eyeglass 21 from the finished lens, it may be provided a grinding machine (not illustrated). The grinding machine is configured for trimming the initial finished lens for obtaining the pre-prescription-eyeglass having the outline 20; and is further configured for grinding the step-back portion 24 in the pre-prescription-eyeglass, such that the shoulder 26 delimits the step-back portion 24.

In practice, for carrying out such machining step, it is sufficient for the grinding machine to know the outline 20 of the prescription-eyeglass 21, the outline 32 of the shoulder 26, and the width of the groove 18.

The grinding machine is accordingly configured for receiving data representative of the outline 20 of the pre-scription-eyeglass 21, of the outline 32 of the shoulder 26 and of the width of the groove 18.

Most often the grinding machine, also called an edger, or edging machine, is adapted to carry out the grinding of the finished lens according to both the outline 20 and the outline 32 of the shoulder 26, in any order as necessary.

Once the user has selected the spectacles 10, these data need to be obtained.

The thickness of the lens that is needed to fit within the groove 18 of a given width can be obtained by measuring the thickness of the template eyeglass 15.

The steps for obtaining the data representative of the outline 32 of the shoulder 26 and data representative of the outline 20 will now be described.

The method includes the step of providing an eyeglass outline editor 34 (FIG. 9) including a user interface 35 for providing an eyeglass visualization 36 and for entering point locations 37 on the eyeglass visualization 36, the editor 34 being configured for outputting data representative of an edited outline 38 on the basis of the point locations 37 entered on the eyeglass visualization 36.

The editor 34 is here further configured for determining data representative of the outline of an eyeglass based on image data of the eyeglass and for outputting the data representative of the outline. The editor 34 is further configured for providing a visualization of the outline based on the determined data representative of the outline. Generally, the editor is also adapted to provide manufacturing data to the grinding machine or edging machine based on the data representative of the outlines so as to enable to grind the finished lens to be trimmed according to the outline of the eyeglass and the outline of the shoulder.

The editor 34 is here part of a computer system having conventionally a central processing unit, a computer data storage device and peripheral devices. The peripheral devices include here a screen, a keyboard and a mouse forming the user interface 35. The method according to the invention is here carried out by executing a computer program installed on the computer system. The computer system may further include and/or be connected to databases on which may be stored data representative of different outlines.

The steps for obtaining the edited outline 38 such that it corresponds to the outline 32 of the shoulder 26 are described in further details below.

For obtaining data representative of the outline 32 of the shoulder 26 of the prescription-eyeglass 21, the observation is made that, as already said, the shoulder 26 of the pre-scription-eyeglass 21 and the inner edge 28 of the arc 12 should have respective outlines as similar as possible. The outline 32 of the shoulder 26 can therefore be deduced from the outline of the inner edge 28, and more specifically of an intersection of the inner edge 28 with the template eyeglass 15.

The determination of the outline 32 of the inner edge 28 will now be described with reference to FIGS. 6 to 9.

Further to the step of selecting the first template eyeglass 15 as to be replaced by the prescription-eyeglass 21, the template eyeglass 15 is removed from the arc 12 of the frame 11.

Figure 6:
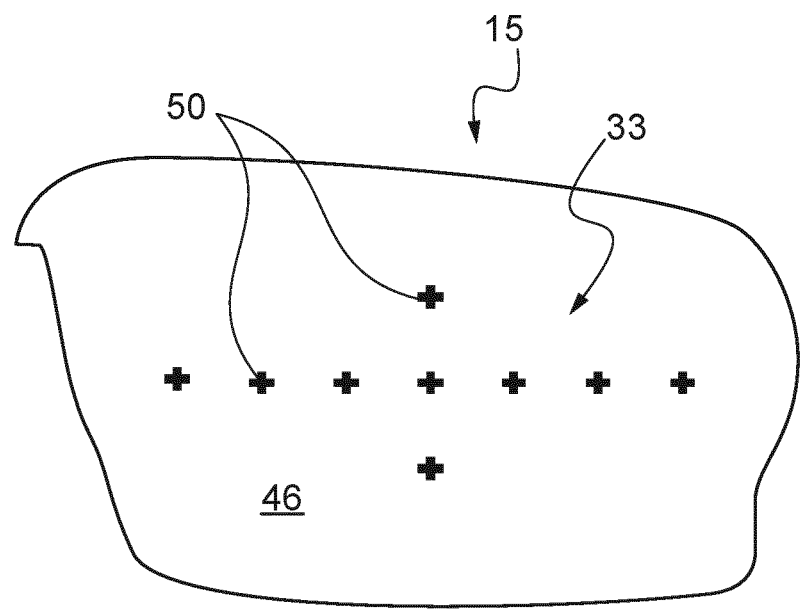
FIG. 6 shows the left template eyeglass of the spectacles of FIG. 1 that has been removed from the left arc and provided with a first embodiment of visible marks.

The method then includes the step of providing a set of visible marks 33 on the first template eyeglass 15 independently of the first arc 12 (FIG. 6).

The visible marks 33 are here in the form of crosses 50 and are here provided on the front face 46 of the template eyeglass 15.

The user here provides the visible marks 33 by ink marking the template eyeglass 15 with a pen (not illustrated).

The visible marks 33 are provided for enabling the determination through observation of the spectacles 10 the location—with respect to the visible marks 33—of points 37 of the first arc 12 from which the template eyeglass 15 projects.

More specifically, the points 37 of the first arc 12 are located on its inner edge 28.

For enabling a more precise determination of the point locations 37 of the first arc 12, the visible marks 33 are distributed along at least one direction, here a first temporal-nasal direction and a second chin-forehead direction.

Here seven of the visible marks 33 are distributed along the temporal-nasal direction and three of the visible marks 33 are distributed along the chin-forehead direction.

Figure 7:
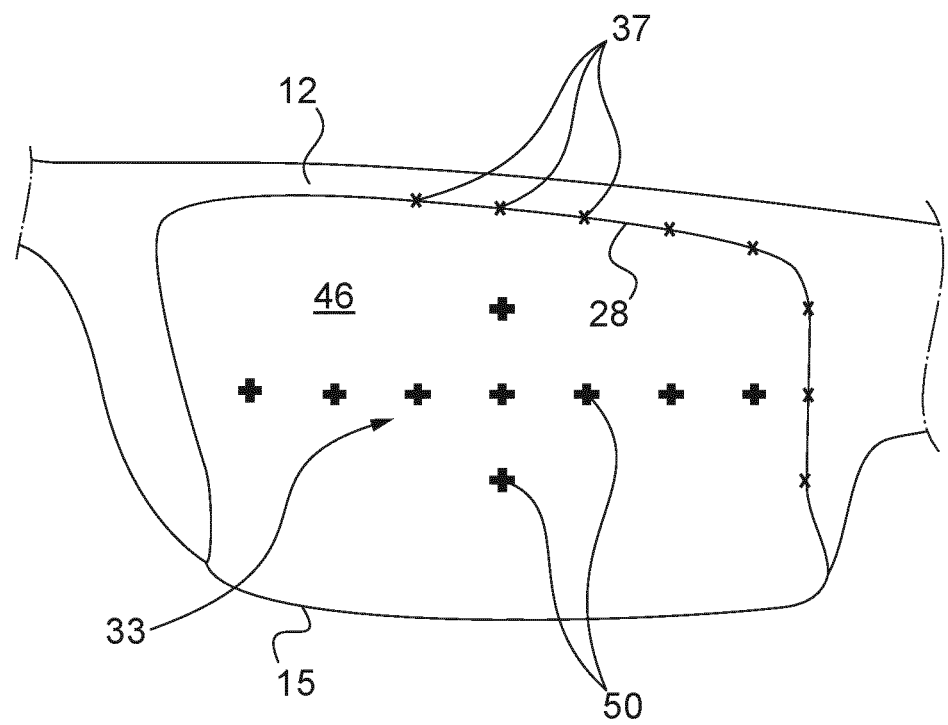
FIG. 7 shows the left template eyeglass of FIG. 7 that has been mounted back into the left arc of the frame.

It should be noted that only a few point locations 37 of the inner edge 28 of the arc 12 are illustrated on FIG. 7 and it will be understood that it may be necessary to determine more point locations 37 than illustrated to obtain from the editor 34 an edited outline 38 corresponding sufficiently precisely to the outline of the inner edge 28.

Figure 9:
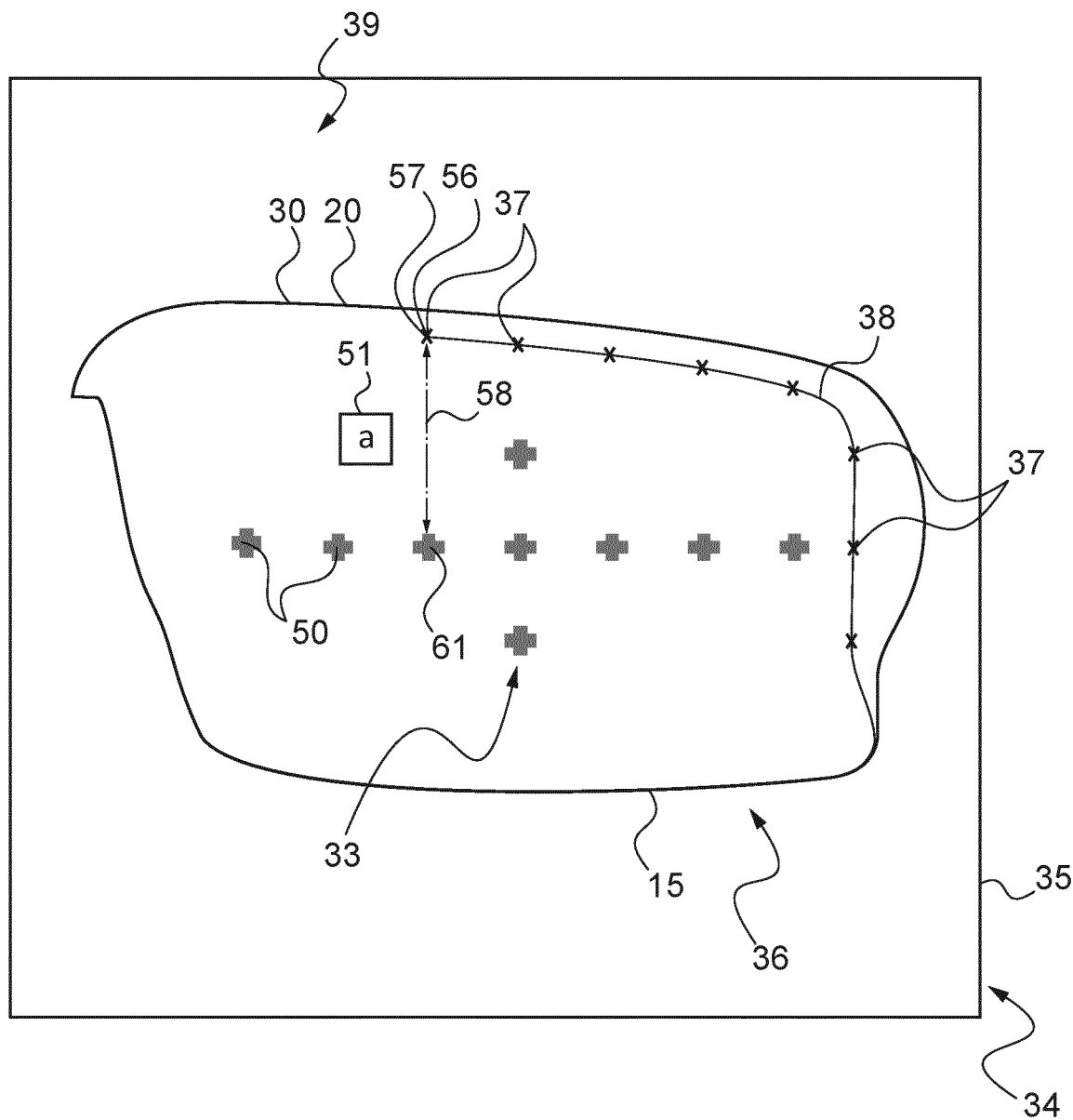
FIG. 9 shows an eyeglass outline editor including a screen displaying together a visualization of the outline of the left template eyeglass, a visualization of the left template eyeglass of FIG. 6 and a visualization of an edited outline of a shoulder of the prescription eyeglass.

It will also be understood that the x-shaped marks identifying the point locations 37 on FIG. 9 are drawn only for explicative purpose and are in reality not materialized on the template-eyeglass 15 or on the frame 11 when carrying out the method according to the invention.

The method then includes the step of obtaining image data of the first template eyeglass 15 provided with the visible marks 33.

The step of obtaining image data of the template eyeglass 15 here includes the step of taking a photography of the front face 46 of the template eyeglass 15.

After the step of obtaining image data, the template eyeglass 15 provided with the visible marks 33 is mounted back into the arc 12 of the frame 11.

The outline editor 34 is then provided with the image data of the first template eyeglass 15 provided with the visible marks 33.

The method then includes the step of having the outline editor 34 providing on the basis of the image data a visualization 36 of the first template eyeglass 15 provided with the visible marks 33.

Based on the image data of the first template eyeglass 15, the outline editor 34 determines data representative of the outline 20 and provides a visualization 39 of the outline 20.

As illustrated on FIG. 9, the visualization 36 of the template eyeglass 15 and the visualization 39 of the outline 20 are displayed on the screen of the user interface 35, here at the same scale and such that the peripheral edge 30 of the template eyeglass 15 is superimposed on the outline 20.

The method then further includes the step of determining through observation of the actual physical spectacles 10 the location—with respect to the visible marks 33—of the points 37 of the first arc 12 from which the template eyeglass 15 projects, or said differently points 37 of the intersection of the first arc 12 and the template eyeglass 15.

The user here benefits from the fact that the visualization 36 visible on the screen of the user interface 34 is an image of the template eyeglass 15 with the visible marks 33 and thus the visible marks 33 are both on the template eyeglass 15 mounted on the spectacles 10 and on the screen of the interface 35. Accordingly, the visible marks 33 may be used as reference to accurately position on the screen some key points of interest of the spectacles 10, for example sample points of the intersection of the first arc 12 and the template eyeglass 15. Such sample points, once positioned accurately on the screen by a user may be used to determine the outline of the intersection of the first arc 12 and the template eyeglass 15, thus allowing to determine the outline 32 to give to the shoulder 26 on the prescription—eyeglass 21.

Figure 8:
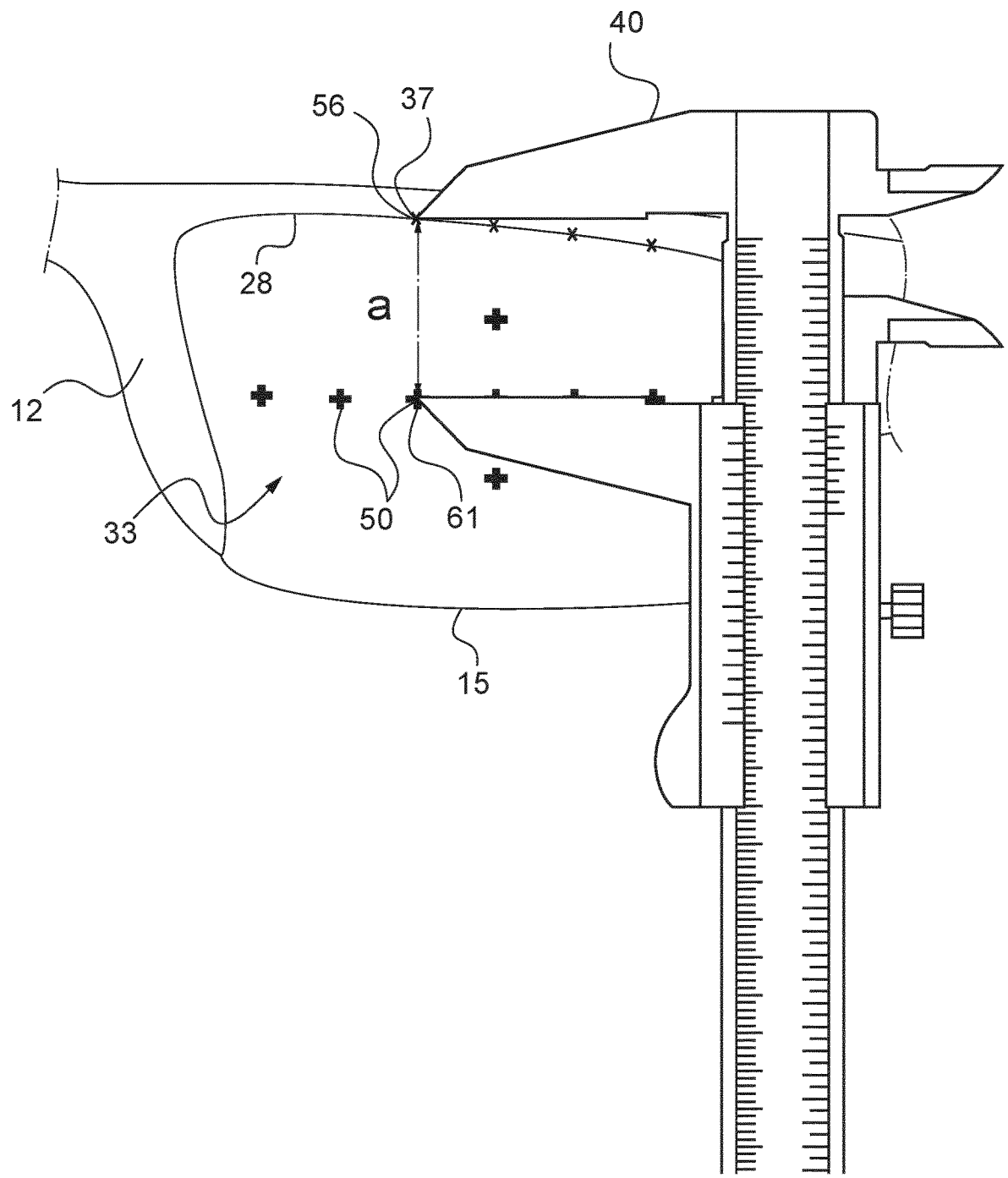
FIG. 8 illustrates a step of measuring a distance between one of the visible marks and a point located on the inner side of the left arc of the frame.

As illustrated on FIG. 8, a measuring tool 40, such as a Vernier calliper, may be used for a more precise determination of the point locations 37 on the spectacles 10. The measuring tool 40 is here a Vernier calliper but in a variant of the method the measuring tool could be a ruler.

Of course, in any of the embodiments of the invention, the use of the measuring tool 40 is not needed if the user estimates that he can determine alone the point locations 37 with sufficient precision with respect to the visible marks 33.

FIGS. 8 and 9 illustrate the determination of a particular point location 56 through observation, here with the use of the measuring tool 40. The user of the measuring tool 40 here measures a distance 'a' between a particular visible cross 50, here particular cross 61, and the particular point location 56, along the forehead-chin direction.

The method then further includes the step of using the interface 35 of the eyeglass outline editor 34 for entering on the provided visualization 36 the so determined locations—with respect to the visible marks 33—of the points 37 of the first arc 12.

For entering on the visualization 36 the determined particular point location 56, the user first selects on the screen the particular visible cross 61 as reference point. The editor 34 then provides on the screen a visualization of a movable point 57 and a visualization of the coordinates of the movable point 57 with respect to the reference point 61, the coordinates being displayed in a dedicated region 51 of the screen. Here the coordinates include the distance between the reference point 61 and the movable point 57. The user then moves the movable point 57 on the screen so as to match the position of the movable point 57 with the position of the particular point 56.

If the user needs a better precision for positioning the movable point 57, he can check that the distance displayed in the dedicated region 51 corresponds to the distance 'a' measured with the tool 40. In addition, the editor 34 here further provides a visualization of a line 58 connecting the reference point 61 and the movable point 57 so as to provide to the user a visual information on the direction according to which is measured the distance between the reference point 61 and the movable point 57. The user can thus check that the direction of the line 58 corresponds to the direction according to which the measurement was done with the tool 40, here the forehead-chin direction.

As the point locations 37 are entered on the visualization 36, the editor 34 here provides a visualization of the edited outline 38 by generating on the screen the smoothest curve connecting the point locations 37. In this manner, the edited outline 38 corresponds to the outline of the inner edge 28 of the arc 12 that in turn corresponds to the outline 32 of the shoulder 26 that has to be obtained on the final prescription lens. Therefore, the data representative of the edited outline 38 are the data representative of the outline 32 of the shoulder 26.

The method then further includes the step of outputting from the editor 34 the data representative of the edited outline 38 on the basis of the point locations 37 so entered on the provided visualization 36, whereby the edited outline 38 is the outline 32 of the shoulder 26.

The method also includes the step of outputting from the editor 34 the data representative of the outline 20.

It is to be noted that in the present method, the data representative of the edited outline 38 and the data representative of the outline 20 are obtained based on the same image data of the template eyeglass 15, thus ensuring that the data representative of the edited outline 38 and the data representative of the outline 20 are obtained with the edited outline 38 and the outline 20 that are in a correct position with respect to each other.

The grinding machine may then be provided with the data representative of the outline 20 of the template eyeglass 15, of the outline of the shoulder 26 and with the finished lens to be edged or trimmed.

With the grinding machine, it is first carried out a step of trimming, also called edging, the finished lens for obtaining the pre-prescription-eyeglass. In this way, the grinding machine is provided with the pre-prescription-eyeglass.

Then, the step of grinding the step-back portion 24 in the pre-prescription-eyeglass may be carried out with the grinding machine, whereby the pre-prescription-eyeglass becomes the prescription-eyeglass 21.

In a variant of the method, it is first carried out the step of grinding the step back portion 24 in the finished lens to obtain a variant of the pre-prescription-eyeglass, and then the step of edging the finished lens to obtain the prescription-eyeglass 21.

FIGS. 10 to 15 illustrate the left template eyeglass 15 provided with visible marks according to other embodiments, respectively in a state removed and a state mounted into the arc 12 of the frame 11.

Figure 10:
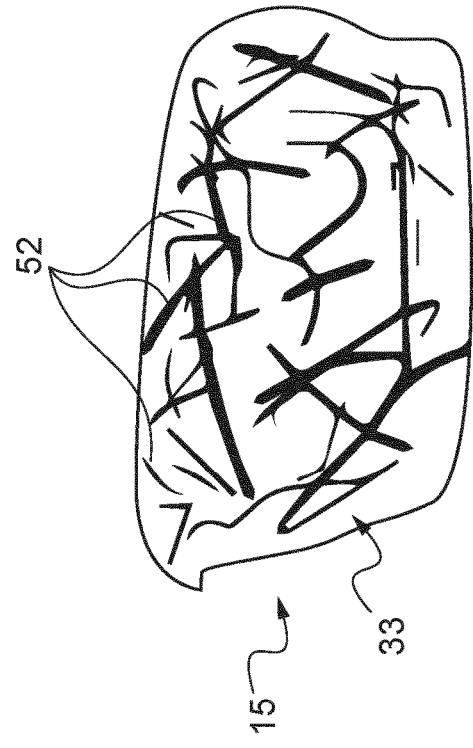
FIG. 10 is a front view of the left template eyeglass provided with another embodiment of the visible marks.
Figure 12:
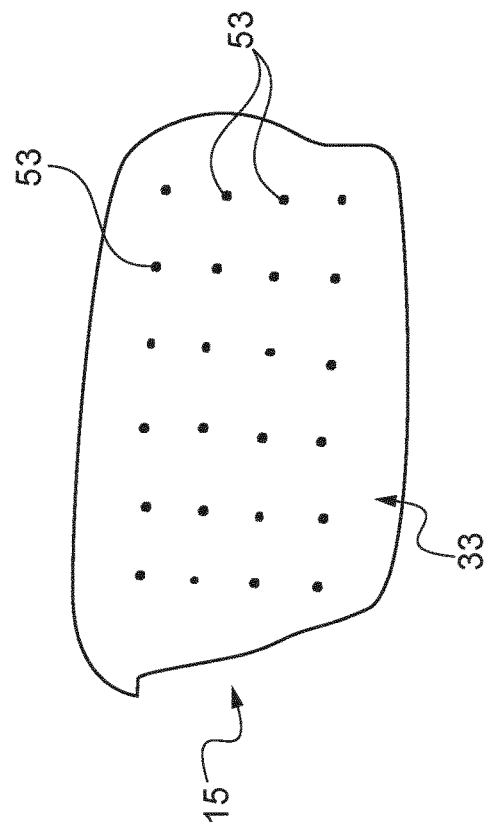

FIGS. 10 and 12 have marks 33 which are substantially spread out on most of the surface of the template eyeglass 15, allowing for an easier visualization of the intersection between the first arc 12 and the template eyeglass 15, in particular by enabling that some of the marks are actually covered, at least partially by the first arc when the template eyeglass is mounted within the frame.

Figure 11:
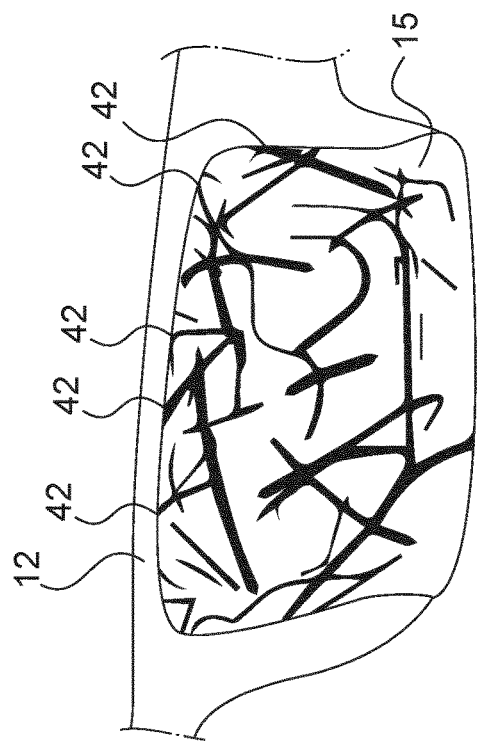
FIG. 11 shows the left template eyeglass of FIG. 10 mounted back into the left arc of the frame.

On FIGS. 10 and 11, the visible marks 33 comprise randomly shaped and distributed markings 52.

In that case, for determining through observation of the spectacles 10 the location—with respect to the visible marks 33—of points 37 of the first arc 12 from which the template eyeglass 15 projects, the user of the editor 34 identifies the portions 42 of the markings 52 covered or partially covered by the groove 18 of the first arc 12.

The random aspect of the markings 52 of the embodiment of FIG. 11 helps the user to quickly identify which markings 52 are covered or partially covered by the first arc 12 of the frame 11 by matching visually the markings shapes, orientation or neighbouring markings. It is thus also easy to identify on the screen the marking corresponding to the covered or partially covered marking on the eyeglass 15 and the position of the first arc 12 with regard to said corresponding marking.

An ink stamp may be used for providing the template eyeglass 15 with the random markings. Alternatively, the markings might be made by hand by the user. Alternatively, the markings might be made by a trimming tool, for example during a previous trimming step of the template eyeglass 15 in a trimming machine.

Figure 13:
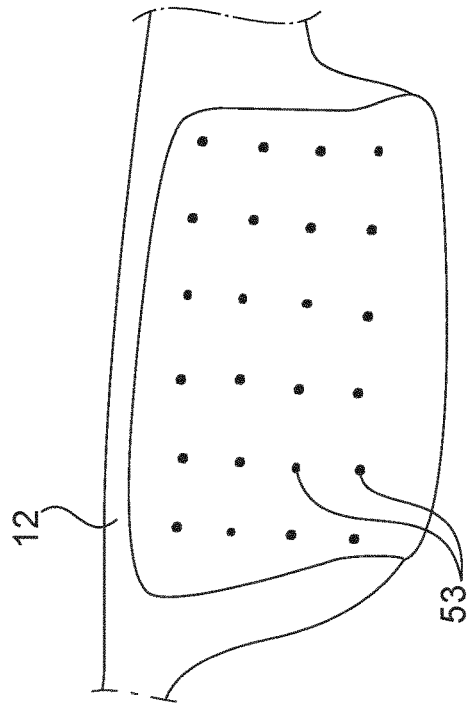
FIGS. 12 and 13 are similar to FIGS. 10 and 11 but for another embodiment of the visible marks.

On FIGS. 12 and 13, the visible marks 33 comprise dots 53.

First dots amongst the dots 53 are aligned according to a first predetermined direction—here a temporal-nasal direction—and second dots amongst the dots 53 are aligned according to a second predetermined direction transverse to said first predetermined dimension—here a forehead-chin direction.

Here, the dots 53 are distributed according to a grid pattern, the dots 53 being distributed according to a first predetermined pitch along the first predetermined direction and according to a second predetermined pitch along the second predetermined direction.

Such a grid pattern, combined optionally to the use of the measuring tool 40 for measuring a distance between the dots 53 and particular point 37 locations, enables to determine precisely the point locations 37.

An ink stamp may be used for providing the eyeglass 15 with the dots 53 arranged in a grid pattern. Alternatively, the dots might be made by a trimming tool, for example during a previous trimming step of the template eyeglass 15 in a trimming machine.

In a variant, the dots are distributed according to a pattern different from a grid pattern, for instance a quincunxes pattern.

Figure 15:
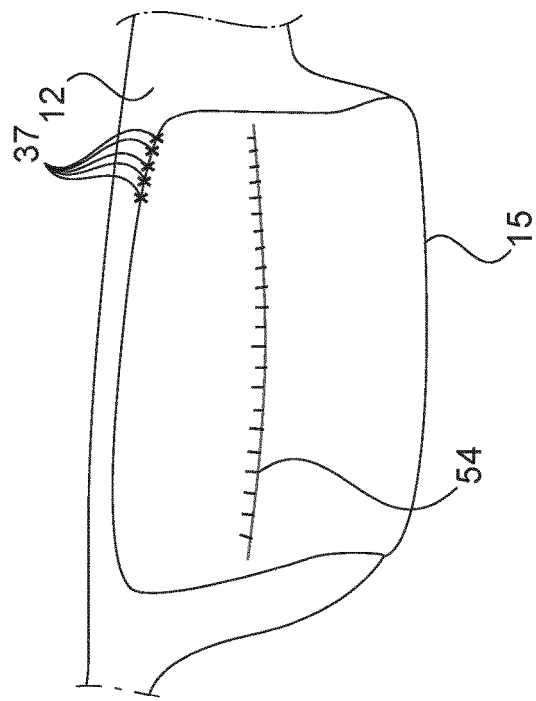
FIGS. 14 and 15 are similar to FIGS. 10 and 11 but for another embodiment of the visible marks.
Figure 14:
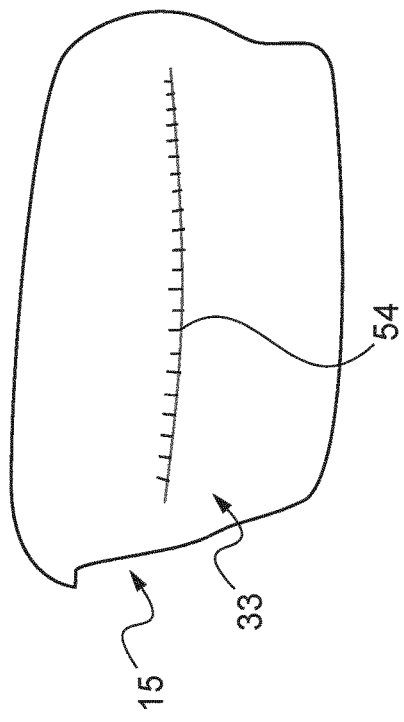

On FIGS. 14 and 15, the visible marks 33 comprise a graduated line 54. Each graduation of the graduated line 54 may be associated to a corresponding point location 37 to be determined. The graduated line 54 is here oriented according to a temporal-nasal direction.

Such a graduated line 54, combined optionally to the use of the measuring tool 40 for measuring a distance between the graduations of the graduated line 54 and particular point 37 locations, enables to determine precisely the point locations 37.

For further facilitating the determination of the point locations 37 of the first arc 12 located on the nasal and temporal sides of the template eyeglass 15, the visible marks may comprise a further graduated line (not illustrated) oriented transversely, called transversal graduated line, to the graduated line 54, for example oriented according to the forehead-chin direction.

Further, the graduated line and/or transversal graduated line may be combined with the embodiment illustrated in FIGS. 12 and 13 so as to provide, from each graduation of the graduated line, and possibly from each graduation of the transversal graduated line, a further line, so as to form a graduated grid. The graduated grid may have thus lines distributed according to a predetermined pitch, for example every 1 mm and/or every 2 mm and/or every 10 mm . . . etc. In an example the graduated grid may have thin lines every 1 mm or every 2 mm and thicker lines every 10 mm.

An ink stamp may be used for providing the template eyeglass 15 with the one or more graduated lines and possible further lines. Alternatively, the graduated lines might be made by a trimming tool, for example during a previous trimming step of the template eyeglass in a trimming machine.

Generally speaking, for all the embodiments of the method disclosed above, it is understood that the visible marks 33 could be applied on the back face of the template eyeglass 15 instead of its front face 46; and that the photography providing image data of the template eyeglass 15 could be accordingly a photography of the back face. Of course, the processing of the data by the editor 34 should be adapted accordingly.

Figure 17:
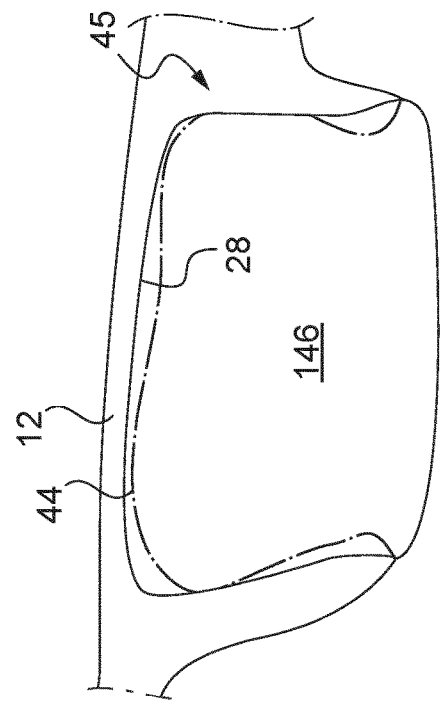
FIGS. 16 and 17 are similar to FIGS. 10 and 11 but for another embodiment of the visible marks, FIG. 16 showing the back face instead of the front face.
Figure 16:
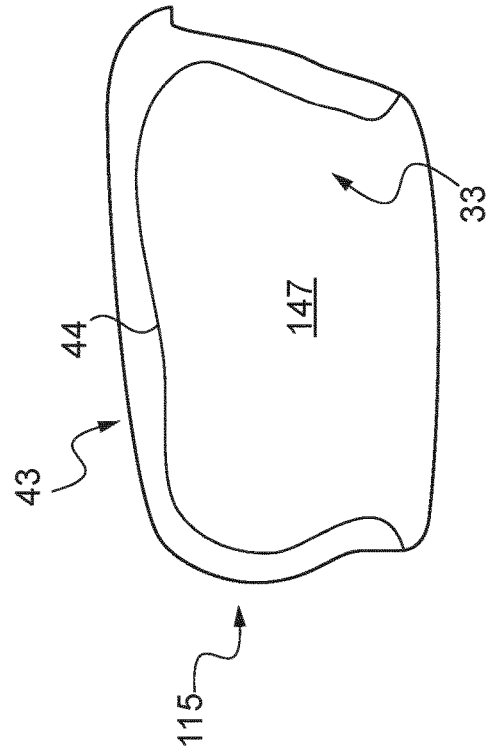

FIGS. 16 and 17 illustrate another embodiment of the left template eyeglass 115 which has been machined for having a landmark step-back portion 43 delimited by a landmark shoulder 44 (the template eyeglass 115 therefore does not have a uniform thickness).

FIG. 16 shows the back face 147 of the template eyeglass 115. It should be noted that the landmark shoulder 44 is here also visible by transparency through the template eyeglass 115 when looking at its front face 146 (landmark shoulder 44 in dotted line on FIG. 17).

As shown on FIG. 17, when the template eyeglass 115 is mounted in the arc 12, the landmark shoulder 44 is away from the arc 12, and in particular from its inner edge 28. It is to be noted that the landmark shoulder 44 may be configured to be away from the arc 12 on either sides of the inner edge 28. Here, the landmark shoulder 44 is externally away from the inner edge 28 in a region 45 of the eyeglass 115 located on the temporal side.

The landmark shoulder 44 here forms the set of visible marks 33.

The landmark shoulder 44 has here an uneven profile.

As in the previous embodiments, image data of the template eyeglass 115 can be obtained by photography. In this case, it may be more convenient to obtain a photography of the back face 147 of the template eyeglass 115.

It should be noted that here, a visualization of the template eyeglass 115 can instead (of a photography) be obtained by providing the editor 34 with data for edging the first template eyeglass 115—such data being representative of the outline 20 of the template eyeglass 115—and data for machining the landmark step-back portion of said first template eyeglass—such data being representative of the outline of the landmark shoulder 44 forming the set of visible marks 33.

Figure 18:
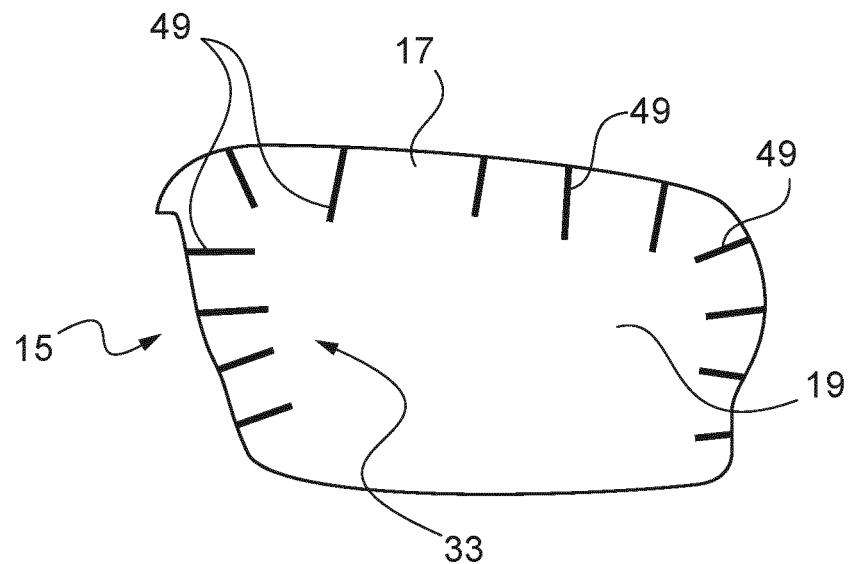
FIG. 18 is similar to FIG. 10 but for another embodiment of the visible marks.
Figure 19:
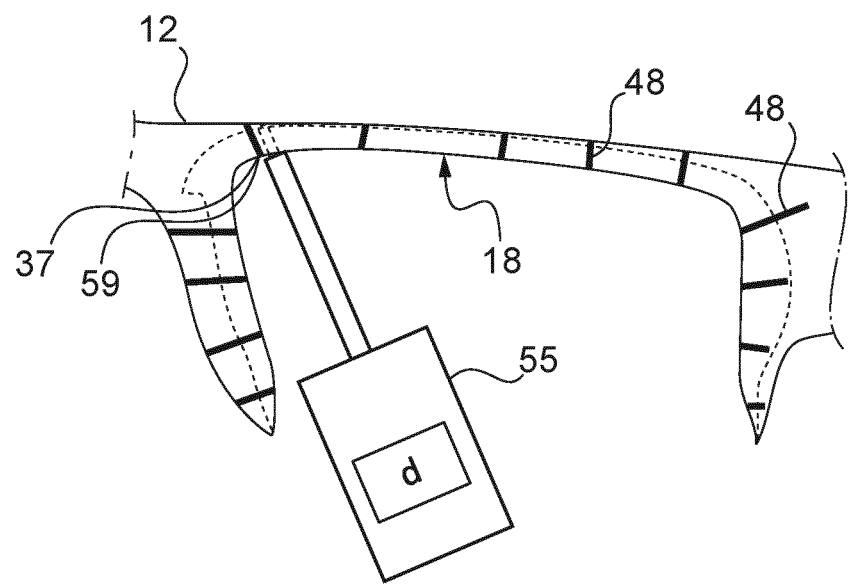
FIG. 19 illustrate a step of measuring the depth of a groove of the left arc.

FIGS. 18 and 19 illustrate a variant of the method for obtaining data representative of the outline of the shoulder 26, in which the visible marks 33 comprise respective lines 49 each extending transversely to and from the edge of the mounting portion 17 both on the mounting portion 17 and on the operational portion 19 of the template eyeglass 15; in which it is further carried out the step of providing the first arc 12 with a landmark 48 at the location of each respective lines 49. Preferentially, the lines 49 are drawn as much as possible perpendicularly to the inner edge 28. In this variant of the method, the step of determining through observation of the spectacles 10 the location—with respect to the visible marks 33—of points 37 of the first arc 12 from which the template eyeglass 15 projects includes the step of measuring the depth of the groove 18 of the arc 12 at each landmark 48.

FIG. 19 illustrates the step of determining a particular point location 37, here point location 59, by measuring the depth of the groove 18 (the bottom of which is visible in dotted line in FIG. 19) at the location of a particular line 49, here particular line 60, with a digital Vernier caliper 55 comprising a depth gauge, the measured value of the depth being cd'.

Figure 20:
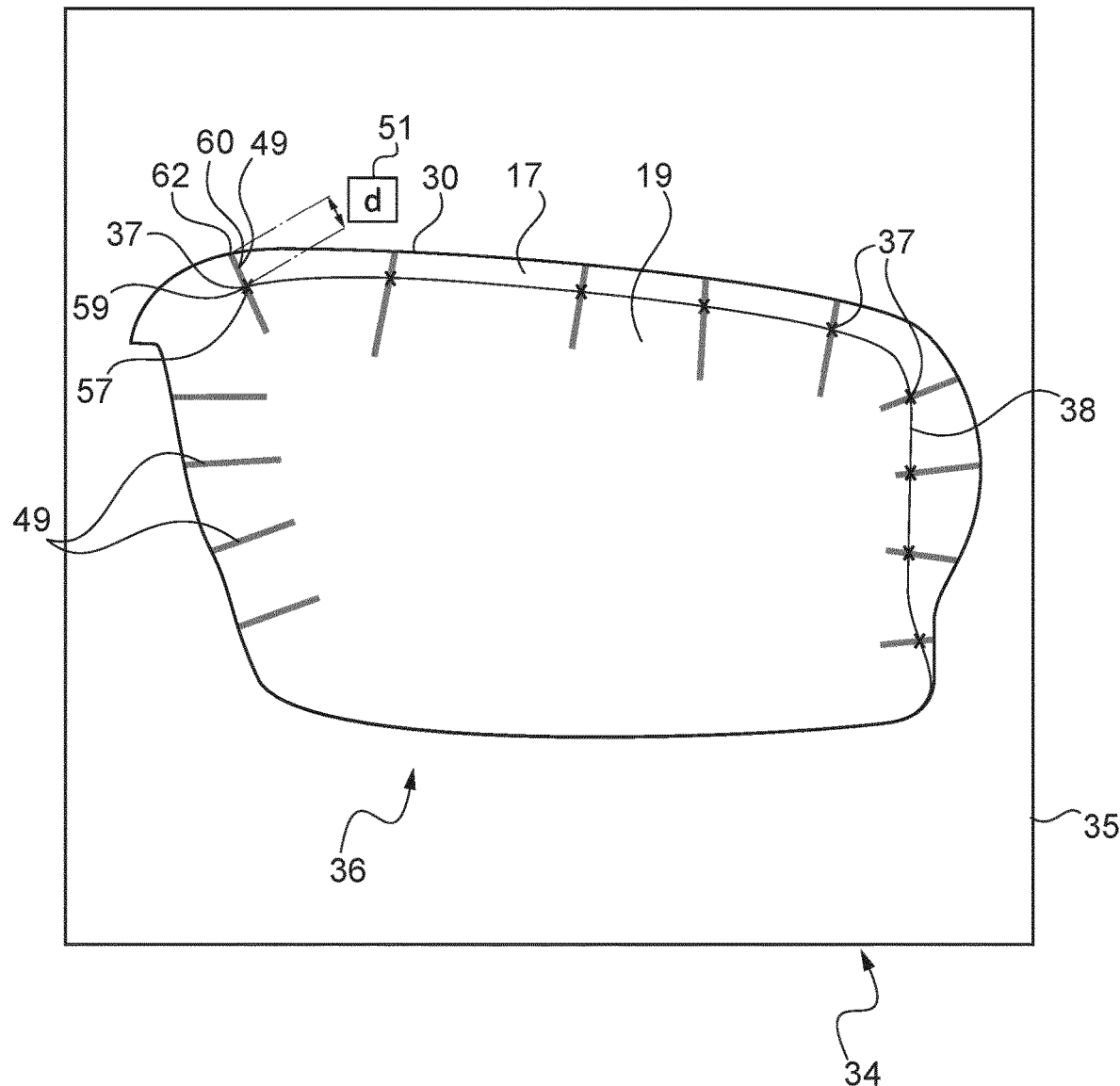
FIG. 20 illustrates the eyeglass outline editor when using a visualization of the left template eyeglass provided with the visible marks of FIG. 19.

FIG. 20 illustrates the use of the editor 34 for entering the particular point location 59 on the eyeglass visualization 36 at the particular line 60, by selecting the end 62 of the particular line 49 that is located on the peripheral edge 30 of the template eyeglass as reference point.

It is to be noted that this variant of the method is not applicable when the width of the mounting portion 17 (the distance between the inner edge 28 of the arc 12 and the peripheral edge 30 of the template eyeglass 15 measured along a radial direction with respect to the template eyeglass 15) does not correspond locally to the depth of the groove 18.

In variants that are not illustrated:
- the step of trimming the initial finished lens for obtaining the pre-prescription-eyeglass is carried out in a distinct machine from the machine configured to carry out the step of grinding the step-back portion in the pre-prescription-eyeglass; or, the steps of trimming and grinding are carried out in a same machine provided with a respective trimming tool and edging tool, or the steps of trimming and grinding may be done within the same machine with the same trimming tool;
- the template eyeglass is a previous prescription glass that needs to be replaced by a similar new prescription glass, in which case the template eyeglass already comprises a shoulder which outline may be used to determine the outline of the shoulder to be edged on the finished lens; the invention applies in that using the shoulder as an initial mark, it is possible for the user to improve the outline of the shoulder to be edged by positioning, on the screen of the user interface of the outline editor, the first arc with regard to the shoulder of the template eyeglass;
- the template eyeglass selected as to be replaced is the right template eyeglass;
- the template eyeglass is provided with visible marks before the spectacles are selected by the user and the image data of the template eyeglass provided with visible marks are generated before the spectacles are selected by the user and are stored in a database from which they can be obtained after the user has selected the spectacles;
- the data representative of the outline of the template eyeglass and/or the data representative of the width of the groove are generated before the spectacles are selected by the user and are stored in a database from which they can be obtained after the user has selected the spectacles;
- image data of the template eyeglass provided with visible marks are obtained by taking a photography of the back face of the template eyeglass, if the marks are visible by transparency;
- the wearer-selected-eyeglass is different from a prescription eyeglass and is another kind of eyeglass too thick to be directly inserted into the groove of the frame, for example a functional eyeglass including an active and/or smart device such as a screen, a sensor or an electronic cell, which can be proposed on an eyeglass without a corrective power;
- the shoulder between the step-back portion and the operational portion is on the front face of the wearer-selected-eyeglass rather than on the back face;
- the graduated line is oriented differently than according to a temporal-nasal direction, for example according to a forehead-chin direction and/or the set of visible marks includes two graduated lines oriented transversally with respect to each other;
- the visible marks are provided on the back face of the template eyeglass;
- the visible marks are different from crosses and are in a different form, for instance in the form of alphanumerical symbols or geometrical forms such as a circles or polygons; and/or
- the visible marks are provided differently as in the examples given above, for instance by engraving notches and/or partial drillings into the first template eyeglass, and/or by mixing the examples of visible marks described above.

It should be noted more generally that the invention is not limited to the examples described and represented.

The invention claimed is:

1. A method for obtaining data representative of the outline of a shoulder delimiting a step-back portion to be machined in a pre-wearer-selected-eyeglass for becoming a wearer-selected-eyeglass comprising said shoulder between said step-back portion and an operational portion, including:
  a) providing spectacles including: an eyeglass frame having a first arc, a second arc and a bridge connecting said first arc and said second arc; a first template eyeglass having a mounting portion inserted in a groove of said first arc and an operational portion projecting from the first arc; and a second template eyeglass having a mounting portion inserted in a groove of said second arc and an operational portion projecting from the second arc;
  b) selecting the first template eyeglass as to be replaced by said wearer-selected-eyeglass and selecting accordingly said pre-wearer-selected eyeglass so that said pre-wearer-selected eyeglass can be machined for said wearer-selected eyeglass to have said step-back portion with a same conformation as the mounting portion of the first template eyeglass;

wherein said method further includes:
  c) providing an eyeglass outline editor including a user interface for providing an eyeglass visualization and for entering point locations on said eyeglass visualization, said editor being configured for outputting data representative of an edited outline on the basis of the point locations entered on said eyeglass visualization;
  d) providing a set of visible marks on said first template eyeglass independently of the first arc, said visible marks being distributed along at least one direction;
  e) obtaining image data of said first template eyeglass provided with said visible marks and having said outline editor providing on the basis of said image data a visualization of said first template eyeglass provided with said visible marks;
  f) measuring the location of points of the first arc, with respect to the visible marks, from which the template eyeglass projects;
  g) entering on said provided visualization the locations—with respect to the visible marks—of said points of the first arc, via said interface of said eyeglass outline editor; and
  h) outputting from said editor said data representative of said edited outline on the basis of the point locations so entered on said provided visualization, whereby said edited outline is said outline of said shoulder.

2. The method according to claim 1, wherein said obtaining said image data of said first template eyeglass provided with said visible marks includes taking a photography of said first template eyeglass.

3. The method according to claim 2, wherein said visible marks comprise randomly shaped and distributed markings and step f) includes identifying the portions of said markings covered or partially covered by said groove of said first arc.

4. The method according to claim 2, wherein said visible marks comprise dots and step f) includes distance measuring.

5. The method according to claim 2, wherein said visible marks comprise crosses and step f) includes distance measuring.

6. The method according to claim 1, wherein said visible marks comprise randomly shaped and distributed markings and step f) includes identifying the portions of said markings covered or partially covered by said groove of said first arc.

7. The method according to claim 6, wherein said visible marks comprise dots and step f) includes distance measuring.

8. The method according to claim 6, wherein said visible marks comprise crosses and step f) includes distance measuring.

9. The method according to claim 1, wherein said visible marks comprise dots and step f) includes distance measuring.

10. The method according to claim 1, wherein said visible marks comprise crosses and step f) includes distance measuring.

11. The method according to claim 10, wherein said first predetermined direction is a temporal-nasal direction and said second predetermined direction is forehead-chin direction.

12. The method according to claim 1, wherein said visible marks are distributed according to a grid pattern, said visible marks being distributed according to a first predetermined pitch along a first predetermined direction and according to a second predetermined pitch along a second predetermined direction transverse to said first predetermined direction.

13. The method according to claim 1, wherein said visible marks comprise a graduated line or a graduated grid and step f) includes distance measuring.

14. The method according to claim 1, wherein said visible marks comprise respective lines each extending transversely to and from the edge of said mounting portion both on the mounting portion and on the operational portion of said first template eyeglass, said method further comprising providing said first arc with a landmark at the location of each said respective lines, and said step f) includes measuring the depth of said groove of said first arc at each said landmark.

15. The method according to claim 1, wherein said visible marks are provided by ink marking said first template eyeglass.

16. The method according to claim 1, wherein said visible marks are provided by engraving notches and/or partial drillings into said first template eyeglass.

17. The method according to claim 1, wherein said set of visible marks is a landmark shoulder away from said first arc, said first template eyeglass being machined for having a landmark step-back portion delimited by said landmark shoulder.

18. The method according to claim 17, wherein said landmark shoulder has an uneven profile.

19. The method according to claim 17, wherein said visualization of said first template eyeglass provided with said visible marks is obtained by providing said editor with data for edging the first template eyeglass and for machining the landmark step-back portion of said first template eyeglass.

20. A method for manufacturing a wearer-selected-eyeglass from a pre-wearer-selected-eyeglass, said wearer-selected-eyeglass comprising a shoulder between a step-back portion and an operational portion, including:

providing a grinding machine configured for receiving data representative of the outline of said shoulder and for grinding said step-back portion in said pre-wearer-selected-eyeglass, whereby said shoulder delimits said step-back portion;

obtaining said data representative of the outline of said shoulder by implementing the method according to claim 1;

providing said grinding machine with said data representative of said outline of said shoulder and with said pre-wearer-selected-eyeglass; and grinding said step-back portion in said pre-wearer-selected-eyeglass, whereby said pre-wearer-selected-eyeglass becomes said wearer-selected-eyeglass.

* * * * *